United States Patent
Fujitsuka et al.

(10) Patent No.: US 9,766,017 B2
(45) Date of Patent: Sep. 19, 2017

(54) HEATING APPARATUS

(75) Inventors: Masashi Fujitsuka, Chiyoda-ku (JP);
Kazunori Tsuchino, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 320 days.

(21) Appl. No.: 14/403,004

(22) PCT Filed: Jun. 15, 2012

(86) PCT No.: PCT/JP2012/003940
§ 371 (c)(1),
(2), (4) Date: Nov. 21, 2014

(87) PCT Pub. No.: WO2013/186822
PCT Pub. Date: Dec. 19, 2013

(65) Prior Publication Data
US 2015/0159960 A1    Jun. 11, 2015

(51) Int. Cl.
*F28F 27/00* (2006.01)
*F28D 20/00* (2006.01)
(Continued)

(52) U.S. Cl.
CPC ..... *F28D 20/0034* (2013.01); *F24D 17/0078* (2013.01); *F24D 17/02* (2013.01);
(Continued)

(58) Field of Classification Search
CPC .. F28D 20/0034; F28D 17/02; F28D 19/1054; F28D 17/0078; F28D 2220/08;
(Continued)

(56) References Cited

U.S. PATENT DOCUMENTS 4,193,441 A * 3/1980 Scaringe .................. F24H 1/18
126/400
5,220,807 A * 6/1993 Bourne ................... F24D 17/02
165/58
(Continued)

FOREIGN PATENT DOCUMENTS

JP    09-072612 A    3/1997
JP    2001-082802 A    3/2001
(Continued)

OTHER PUBLICATIONS

International Search Report dated Sep. 11, 2012 in PCT/JP2012/003940 filed Jun. 15, 2012.
(Continued)

Primary Examiner — Ljiljana Ciric
(74) Attorney, Agent, or Firm — Oblon, McClelland, Maier & Neustadt, L.L.P.

(57) ABSTRACT

A thermal storage and exchange heating apparatus includes: a thermal storage tank that stores a heated heat medium; a circulation channel connected to high and low temperature sides of the thermal storage tank, and through which the heat medium circulates; a heat exchanger provided to the circulation channel and configured to exchange heat between the heat medium and a heating object, to heat the heating object; a circulation direction switch configured to switch circulation of the heat medium in the circulation channel between a forward direction from the high-temperature side to the low-temperature side and a reversed backward direction; and a controller configured to cause the heat medium to circulate in the forward direction by switching the circulation direction switch in a heating operation and causing the heat medium to circulate in the backward direction by switching the circulation direction switch after a stop of the heating operation.

12 Claims, 4 Drawing Sheets

(51) Int. Cl.
*F25B 30/02* (2006.01)
*F24H 4/04* (2006.01)
*F24D 17/02* (2006.01)
*F24D 19/10* (2006.01)
*F24D 17/00* (2006.01)

(52) U.S. Cl.
CPC ........... *F24D 19/1054* (2013.01); *F24H 4/04* (2013.01); *F25B 30/02* (2013.01); *F24D 2220/08* (2013.01); *F25B 2339/047* (2013.01); *F28D 2020/0073* (2013.01); *F28D 2020/0078* (2013.01)

(58) Field of Classification Search
CPC ..... F28D 2020/0073; F28D 2020/0078; F25B 2339/047; F25C 30/02
See application file for complete search history.

(56) References Cited

U.S. PATENT DOCUMENTS

| | | | | |
|---|---|---|---|---|
| 6,793,007 | B1* | 9/2004 | Kramer | C09K 5/10 165/104.33 |
| 8,851,066 | B1* | 10/2014 | Kapteyn | F24J 2/34 126/620 |
| 2009/0301468 | A1* | 12/2009 | Gray | F24D 11/003 126/640 |
| 2010/0025031 | A1* | 2/2010 | Liu | F24F 5/0017 165/287 |
| 2010/0257890 | A1* | 10/2010 | Murakami | B60H 1/00492 62/430 |
| 2012/0152488 | A1* | 6/2012 | Yatchak | F28D 20/0043 165/45 |
| 2013/0076033 | A1* | 3/2013 | Zachary | F24D 5/04 290/2 |
| 2014/0102662 | A1* | 4/2014 | Grama | F28D 20/0034 165/10 |
| 2014/0224295 | A1* | 8/2014 | Yazawa | F24J 2/42 136/206 |

FOREIGN PATENT DOCUMENTS

| | | |
|---|---|---|
| JP | 2003-50050 A | 2/2003 |
| JP | 2006-183960 A | 7/2006 |
| JP | 2007-333284 A | 12/2007 |
| JP | 2009-250542 A | 10/2009 |
| JP | 2011-033250 A | 2/2011 |
| JP | 2011-141050 A | 7/2011 |
| JP | 2011-145010 A | 7/2011 |
| JP | 2012-047416 A | 3/2012 |

OTHER PUBLICATIONS

Office Action and Search Report dated Jul. 27, 2016 in the corresponding Chinese Patent Application No. 2012800739563 (with portion of English Translation and Translation of Category of Cited Documents).

Extended European Search Report dated Mar. 9, 2016 in Patent Application No. 12878724.9.

Office Action dated Sep. 1, 2015 in Japanese Patent Application No. 2014-520805 (with English language translation).

Chinese Office Action dated Feb. 10, 2017 in Patent Application No. 201280073956.3 (with English Translation).

Office Action dated Apr. 3, 2017 in European Patent Application No. 12 878 724.9.

* cited by examiner

HEATING APPARATUS

TECHNICAL FIELD

The present invention relates to a thermal storage and exchange heating apparatus that heats a heating object by exchanging heat between the heating object and a heat medium supplied from a thermal storage tank.

BACKGROUND ART

In a typical thermal storage and exchange heating apparatus, a heat medium heated with a heat pump is caused to circulate from an upper portion to a lower portion of a thermal storage tank by way of a heat exchanger and is used for heat exchange between a heating object and the heat exchanger, and the heating object heated by the heat exchange is supplied through a mixing faucet (see, for example, Patent Literature 1).

CITATION LIST

Patent Literature

Patent Literature 1: Japanese Unexamined Patent Application Publication No. 2009-250542 (paragraphs [0022]-[0024] and FIG. 2)

SUMMARY OF INVENTION

Technical Problem

In such a typical thermal storage and exchange heating apparatus, when heating of a heating object stops, a hot heat medium remains in a circulation channel and a heat exchanger.

Accordingly, if heating starts again after a long interval, the remaining heat medium transfers heat, resulting in a waste of energy.

In addition, superheating of the heating object in the heat exchanger with the heat medium remaining in the heat exchanger facilitates generation of scales in the heat exchanger and causes clogging and an increase in a pressure loss of the heating object, leading to degraded performance and a short lifetime of the heat exchanger.

The present invention has been made to solve such problems, and provides a thermal storage and exchange heating apparatus with enhanced energy saving performance obtained by reducing heat transfer of a heat medium after a stop of heating.

The present invention also provides a thermal storage and exchange heating apparatus for which performance degradation and decrease in lifetime of a heat exchanger are reduced by suppressing superheating of a heating object after the stop of heating.

Solution to Problem

A thermal storage and exchange heating apparatus according to the present invention includes: a thermal storage tank that stores a heated heat medium; a circulation channel connected to a high-temperature side and a low-temperature side of the thermal storage tank, and through which the heat medium circulates; a heat exchanger provided to the circulation channel and configured to exchange heat between the heat medium and a heating object and to heat the heating object; circulation direction switching means configured to switch circulation of the heat medium in the circulation channel between a forward direction from the high-temperature side of the thermal storage tank to the low-temperature side of the thermal storage tank and a backward direction from the low-temperature side of the thermal storage tank to the high-temperature side of the thermal storage tank; and control means configured to cause the heat medium to circulate in the forward direction set by switching of the circulation direction switching means in a heating operation of the heating object and causing the heat medium to circulate in the backward direction set by switching of the circulation direction switching means after a stop of the heating operation of the heating object.

Advantageous Effects of Invention

The present invention includes control means for causing a heat medium to circulate in a backward direction set by circulation direction switching means after a stop of a heating operation of a heating object. Thus, it is possible to reduce heat transfer caused by a high-temperature heat medium remaining in a circulation channel and a heat exchanger. As a result, energy saving performance can be enhanced.

In addition, since the present invention includes the control means for causing the heat medium to circulate in the backward direction set by the circulation direction switching means after the stop of the heating operation, it is possible to reduce superheat of the heating object in the heat exchanger caused by the heat medium remaining in the heat exchanger. As a result, performance degradation and a decrease in lifetime caused by generation of scales can be reduced.

DESCRIPTION OF EMBODIMENTS

Thermal storage and exchange heating apparatus according to the present invention will be described with reference to the drawings.

Embodiments 1 and 2 are directed to the case of using thermal storage and exchange heating apparatus for a hot water supply, but the thermal storage and exchange heating apparatus may be used for other purposes.

Embodiment 3 is directed to the case of using a thermal storage and exchange heating apparatus for reheating, but the thermal storage and exchange heating apparatus may be used for other purposes.

In the drawings, the same members or the same portions are denoted by the same reference signs.

Detailed parts of the configuration are not shown when unnecessary.

Description of the same parts will be simplified or will not be repeated when necessary.

Embodiment 1

A thermal storage and exchange heating apparatus according to Embodiment 1 will be described.

(Device Configuration)

A configuration of the thermal storage and exchange heating apparatus of Embodiment 1 will be described with reference to FIG. 1.

Figure 1:
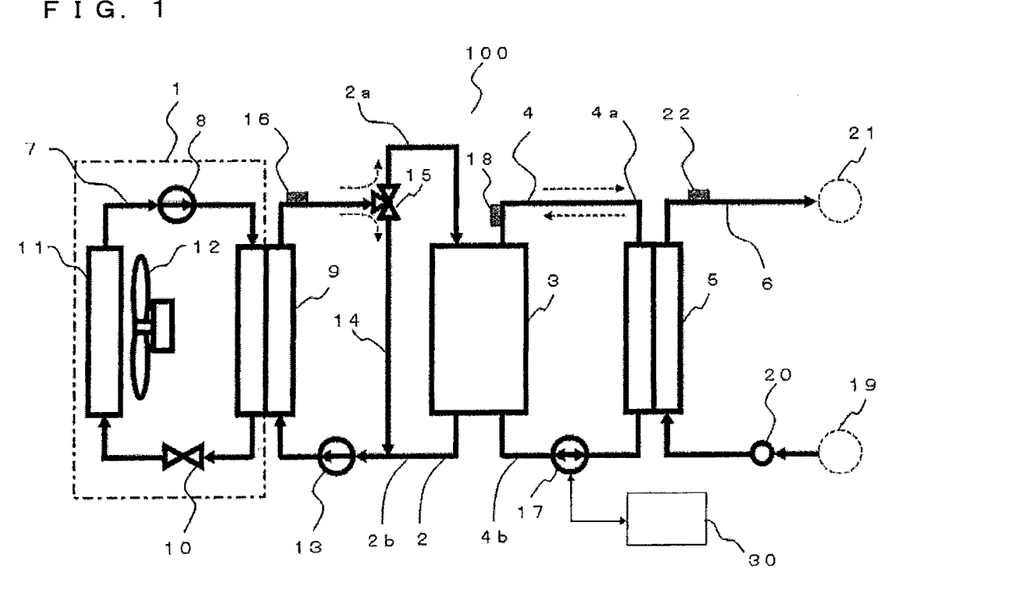
FIG. 1 illustrates a configuration of a thermal storage and exchange heating apparatus according to Embodiment 1 of the present invention.

FIG. 1 illustrates the configuration of the thermal storage and exchange heating apparatus of Embodiment 1.

A thermal storage and exchange heating apparatus 100 includes a heat pump 1, a thermal storage circulation channel 2, a thermal storage tank 3, a heating circulation channel 4, a heating heat exchanger 5, and a hot water supply channel 6.

The heat pump 1 includes a heat pump circulation channel 7 in which a heat pump heat medium circulates, a compressor 8, a heat pump heat exchanger 9, an expansion valve 10, an outdoor air heat exchanger 11, and a fan 12.

The heat pump heat medium is, for example, a hydrocarbon-based medium or carbon dioxide, and can be changed into a two-phase gas-liquid state within the ranges of the temperature and the pressure used.

The heat pump heat exchanger 9 is connected to the thermal storage circulation channel 2.

In the thermal storage circulation channel 2, a thermal storage heat medium circulates.

The thermal storage heat medium is, for example, water mixed with glycerin or other substances, and is an antifreeze that is not solidified at low temperatures. The thermal storage heat medium corresponds to a "heat medium" of the present invention.

The thermal storage circulation channel 2 is provided with a thermal storage pump 13 for circulating a thermal storage heat medium, a bypass channel 14 connecting a portion of a forward path 2a and a portion of a backward path 2b of the thermal storage circulation channel 2, a switching valve 15 for switching the flow of the thermal storage heat medium between a flow into the bypass channel 14 and a flow into the thermal storage tank 3, and a temperature sensor 16 for detecting the temperature of the thermal storage heat medium between the heat pump heat exchanger 9 and the switching valve 15.

The switching valve 15 is disposed at a branch point of the portion of on the forward path 2a of the thermal storage circulation channel 2 and the bypass channel 14.

The thermal storage circulation channel 2 is connected to an upper portion (corresponding to a "high-temperature side" of the present invention) of the thermal storage tank 3.

The thermal storage tank 3 stores the thermal storage heat medium.

A lower portion (corresponding to a "low-temperature side" of the present invention) of the thermal storage tank 3 is connected to the thermal storage circulation channel 2.

The upper portion of the thermal storage tank 3 is connected to the heating circulation channel 4.

In the heating circulation channel 4, the thermal storage heat medium circulates.

The heating circulation channel 4 is provided with a heating pump 17 for circulating the thermal storage heat medium and a temperature sensor 18 for detecting the temperature of the thermal storage heat medium between the upper portion of the thermal storage tank 3 and the heating heat exchanger 5.

The heating circulation channel 4 is connected to the lower portion of the thermal storage tank 3.

The heating pump 17 is a bidirectional rotary pump that can rotate in opposite directions, and is connected to a controller 30. Other components can also be connected to the controller 30 when necessary. The controller 30 corresponds to "control means" of the present invention.

The heating pump 17 serves as circulation direction switching means for switching the direction of circulation of the thermal storage heat medium in the heating circulation channel 4 between a direction from the upper portion to the lower portion of the thermal storage tank 3 and a direction from the lower portion to the upper portion of the thermal storage tank 3. Circulation in the direction from the upper portion to the lower portion of the thermal storage tank 3 will be referred to as a forward circulation, and circulation in the direction from the lower portion to the upper portion of the thermal storage tank 3 will be referred to as a backward circulation.

The heating heat exchanger 5 is connected to the heating circulation channel 4 and the hot water supply channel 6.

The hot water supply channel 6 is supplied with water for hot water supply (hereinafter referred to as hot-water-supply water, which corresponds to a "heating object" of the present invention).

The hot water supply channel 6 is provided with a flow sensor 20 for detecting the presence of a flow of hot-water-supply water between a water supply source 19 and the heating heat exchanger 5 and a temperature sensor 22 for detecting the temperature of hot-water-supply water between the heating heat exchanger 5 and a hot water supply target 21.

The flow sensor 20 is a sensor whose contact point is turned on or off depending on the presence of a flow of the hot-water-supply water.

The operation of the thermal storage and exchange heating apparatus of Embodiment 1 will now be described.

(Overall Operation)

The overall operation of the thermal storage and exchange heating apparatus of Embodiment 1 will be described.

The heat pump 1 is a heat source and supplies a heated heat pump heat medium to the heat pump heat exchanger 9.

The thermal storage pump 13 supplies a thermal storage heat medium from the lower portion of the thermal storage tank 3 to the thermal storage circulation channel 2, and supplies the thermal storage heat medium supplied to the thermal storage circulation channel 2 to the heat pump heat exchanger 9.

The thermal storage heat medium heated through heat exchange in the heat pump heat exchanger 9 is supplied to the upper portion of the thermal storage tank 3. The thermal storage tank 3 stores a predetermined amount of the heated thermal storage heat medium, that is, stores heat generated by the heat pump 1.

The heating pump 17 supplies the thermal storage heat medium from the upper portion of the thermal storage tank 3 to the heating circulation channel 4, and supplies the thermal storage heat medium supplied to the heating circulation channel 4 to the heating heat exchanger 5.

Hot-water-supply water is supplied from the water supply source 19 to the hot water supply channel 6 and then to the heating heat exchanger 5.

Hot-water-supply water heated through heat exchange in the heating heat exchanger 5 is released from the hot water supply target 21.

(Operation of Heat Pump)

The operation of the heat pump in the thermal storage and exchange heating apparatus of Embodiment 1 will now be described.

In the heat pump circulation channel 7, a heat pump heat medium circulates.

The compressor 8 compresses a heat pump heat medium in a gas phase so that the medium has a high temperature and high pressure.

The heat pump heat exchanger 9 performs heat exchange between the high-temperature high-pressure heat pump heat medium and the thermal storage heat medium, cools the heat pump heat medium so as to liquefy the heat pump heat medium, and heats the thermal storage heat medium.

The expansion valve 10 expands the liquefied heat pump heat medium so that the medium is in a gas-liquid mixture phase at a low temperature and low pressure.

The outdoor air heat exchanger 11 performs heat exchange between the low-temperature low-pressure heat pump heat medium and outdoor air supplied from the fan 12, and heats the heat pump heat medium so that the medium becomes a gas phase.

In this manner, the thermal storage and exchange heating apparatus 100 employs the heat pump 1 as a heat source, transfers heat received from the outdoor air to the thermal storage medium by using condensation and vaporization of the heat pump heat medium. Thus, heat can be efficiently transferred between the outdoor air and the thermal storage heat medium only with power that is necessary mainly for compression in the compressor 8.

(Thermal Storage Operation)

The thermal storage operation in the thermal storage and exchange heating apparatus of Embodiment 1 will now be described.

The thermal storage heat medium heated by the heat pump heat exchanger 9 passes through the forward path 2a of the thermal storage circulation channel 2 and is supplied to the upper portion of the thermal storage tank 3.

Accordingly, a low-temperature thermal storage heat medium is supplied to the heat pump heat exchanger 9 from the lower portion of the thermal storage tank 3 by way of the backward path 2b of the thermal storage circulation channel 2.

This operation is repeated so that the low-temperature thermal storage heat medium is gradually replaced by the high-temperature thermal storage heat medium from the upper portion to the lower portion of the thermal storage tank 3, and heat generated by the heat pump 1 is stored in the thermal storage tank 3. This thermal storage process will be referred to as temperature-stratified thermal storage.

When the thermal storage heat medium is not heated to temperatures at which the thermal storage heat medium exhibits a thermal storage function, for example, immediately after a start of thermal storage, the switching valve 15 supplies the thermal storage heat medium to the bypass channel 14 so that the thermal storage heat medium can be heated again by the heat pump heat exchanger 9.

When the thermal storage heat medium is heated to temperatures at which the thermal storage heat medium exhibits the thermal storage function, the switching valve 15 supplies the thermal storage heat medium to the upper portion of the thermal storage tank 3.

This configuration can perform the temperature-stratified thermal storage of the thermal storage tank 3 more efficiently.

In the thermal storage and exchange heating apparatus 100, a three-way valve as the switching valve 15 is provided at the branch point from the forward path 2a to the bypass channel 14, but may be at a joint point between the backward path 2b and the bypass channel 14.

In such a case, the service condition is at a low temperature so that the lifetime of the switching valve increases and heat transfer from the switching valve decreases.

The thermal storage and exchange heating apparatus 100 includes the three-way valve as the switching valve 15, but may include a two-way valve for each channel to be switched.

In such a case, the number of options in selecting the channel increases.

Temperature control in the thermal storage operation will now be described.

The rotation speed of the thermal storage pump 13 is changed such that the temperature of the thermal storage heat medium detected by the temperature sensor 16 is maintained at a predetermined temperature (e.g., 63 degrees C.), and the flow rate of the thermal storage heat medium circulating in the thermal storage circulation channel 2 is controlled.

In addition, the rotation speed (the frequency) of the compressor 8 and the opening degree of the expansion valve 10 are controlled in accordance with the temperature and the pressure of a heat pump heat medium in each portion of the heat pump circulation channel 7 such that the quantity of heat transferred from the outdoor air to the thermal storage heat medium in the heat pump 1 is equal to the quantity of heat (e.g., the maximum quantity of heat in the case of thermal storage in the minimum time) permitted under temperature conditions of the outdoor air and the thermal storage heat medium in the heat pump heat exchanger 9.

(Heating Operation)

The heating operation in the thermal storage and exchange heating apparatus of Embodiment 1 will now be described.

In a hot water supply state, the thermal storage heat medium is supplied from the upper portion of the thermal storage tank 3 to the heating heat exchanger 5 by way of a forward path 4a of the heating circulation channel 4.

Accordingly, the thermal storage heat medium is supplied from the heating heat exchanger 5 to the lower portion of the thermal storage tank 3 by way of a backward path 4b of the heating circulation channel 4.

In the hot water supply state, in the heating heat exchanger 5, heat exchange is performed between the thermal storage heat medium in the heating circulation channel 4 and the hot-water-supply water in the hot water supply channel 6.

In this heat exchange, hot-water-supply water in an amount equal to that of hot-water-supply water that flows from the heating heat exchanger 5 to the hot water supply target 21 is supplied from the water supply source 19 to the heating heat exchanger 5.

The power source for supplying hot-water-supply water to the heating heat exchanger 5 is a pressure difference in hot-water-supply water between the water supply source 19 and the hot water supply target 21.

The presence of the hot water supply state is determined based on detection of a flow of hot-water-supply by the flow sensor 20.

If a flow of hot-water-supply is detected, the heating operation for hot water supply is performed. Otherwise, the heating operation for hot water supply is not performed.

The heating operation herein means an operation of the heating pump 17.

That is, when the heating operation is performed, the heating pump 17 is driven. When the heating operation is not performed, the heating pump 17 is not driven.

Driving of the heating pump 17 in a normal rotational direction causes the thermal storage heat medium (at, for example, 63 degrees C.) to circulate in a forward direction and to be supplied from the upper portion of the thermal storage tank 3 to the heating heat exchanger 5 by way of the forward path 4a of the heating circulation channel 4.

Hot-water-supply water (at, for example, 20 degrees C.) is supplied from the water supply source 19 to the heating heat exchanger 5.

Hot-water-supply water (at, for example, 40 degrees C.) heated through heat exchange with the thermal storage heat medium flows out to the hot water supply target 21.

The thermal storage heat medium supplied by way of the heating heat exchanger 5 performs heat exchange with hot-water-supply water and has its temperature reduced, and returns to the lower portion of the thermal storage tank 3 by way of the backward path 4b of the heating circulation channel 4.

Temperature control in the heating operation will now be described.

Suppose the temperature conditions are the above-described temperature conditions (in which the temperature of the thermal storage heat medium is 63 degrees C., the temperature of hot-water-supply water before passing through the heating heat exchanger 5 is 20 degrees C., and the temperature of hot-water-supply water after passing through the heating heat exchanger 5 is 40 degrees C.), the flow rate of hot-water-supply water is 1.5 times as high as the flow rate of the thermal storage heat medium, heat transfer is negligible, and the heating heat exchanger 5 exhibits such heat exchange performance that allows the temperature of the thermal storage heat medium returning from the heating heat exchanger 5 to the lower portion of the thermal storage tank 3 is at 33 degrees C. In this case, the temperature of the thermal storage heat medium returning to the lower portion of the thermal storage tank 3 depends on the flow rate and temperature of hot-water-supply water, the flow rate and temperature of the thermal storage heat medium in the heating circulation channel 4, and the heat exchange performance and heat transfer performance of the heating heat exchanger 5.

In this state, when the flow rate of hot-water-supply water decreases to a half with a constant temperature (e.g., 40 degrees C.) of hot-water-supply water required for the hot water supply target 21, suppose performance of the heating heat exchanger 5 can be maintained at the same level, the flow rate of the thermal storage heat medium needs to be a half of the flow rate, that is, 1.5 times as high as the flow rate of hot-water-supply water whose temperature has decreased to a half. In general, a decrease in flow rate reduces the amount of heat exchange by a heat exchanger and the heat exchange efficiency per a unit flow rate of the heat exchanger but keeps the area of heat exchange at the same level. Thus, heat exchange performance of the heat exchanger tends to be enhanced.

This is because of the following reasons. A change in flow rate of the thermal storage heat medium in the heating circulation channel 4 by the controller 30 upon a change in flow rate of hot-water-supply water enables the temperature of hot-water-supply water flowing to the hot water supply target 21 to be maintained at the same level.

The thermal storage and exchange heating apparatus 100 utilizes this mechanism, and the controller 30 changes the rotation speed of the heating pump 17, that is, the flow rate of the thermal storage heat medium in the heating circulation channel 4 so as to control the temperature of hot-water-supply water detected by the temperature sensor 22 at a desired temperature.

In a case where heat exchange performance of the heat exchanger changes in accordance with a change in flow rate, for example, a case where heat exchange performance of the heat exchanger increases by 1.2 times with a decrease in flow rate of hot-water-supply water to a half, the controller 30 can control the temperature of hot-water-supply water detected by the temperature sensor 22 to a desired temperature (40 degrees C.) by changing the flow rate of the thermal storage heat medium in the heating circulation channel 4.

In this case, the temperature of the thermal storage heat medium in the backward path 4b of the heating circulation channel 4 is 27 degrees C.

(Circulation Direction Switching Operation)

The operation of switching the circulation direction in the thermal storage and exchange heating apparatus of Embodiment 1 will be described.

The thermal storage and exchange heating apparatus 100 employs the bidirectional rotary pump that can rotate in opposite directions as the heating pump 17, and thus, the thermal storage heat medium in the heating circulation channel 4 is allowed to circulate in a forward direction and a backward direction.

When heating hot-water-supply water, the heating pump 17 causes the thermal storage heat medium to flow in the forward direction.

When stopping the heating of hot-water-supply water, the heating pump 17 causes the thermal storage heat medium to circulate in the backward direction and returns the high-temperature thermal storage medium remaining in the heating circulation channel 4 and the heating heat exchanger 5 to the thermal storage tank 3.

The controller 30 starts the backward circulation after a lapse of a predetermined time (hereinafter referred to as a backflow standby time). The backflow standby time corresponds to a first predetermined time of the present invention.

The controller 30 performs the backward circulation for a predetermined time (hereinafter referred to as a backflow execution time). The backflow execution time corresponds to a second predetermined time of the present invention.

When the temperature of the thermal storage heat medium detected by the temperature sensor 18 after the start of backward circulation decreases below a predetermined set lowest temperature (e.g., 60 degrees C.), the controller 30 stops the backward circulation even if an elapsed time from the start of backward circulation does not exceeds the backflow execution time. The set lowest temperature corresponds to a second predetermined temperature of the present invention.

The backflow standby time is defined by previously measuring the time in which heat transfer of the thermal storage heat medium does not become large.

The backflow execution time is defined by obtaining a time before a significant decrease in the temperature of the thermal storage heat medium detected by the temperature sensor 18, that is, the time before the detected temperature of the thermal storage heat medium reaches the temperature of the thermal storage heat medium in a region in which the backward path 4b of the heating circulation channel 4 is connected to the lower portion of the thermal storage tank 3, in heating hot-water-supply water. The temperature of the thermal storage heat medium in a region where the backward path 4b of the heating circulation channel 4 is connected to the lower portion of the thermal storage tank 3 corresponds to a first predetermined temperature of the present invention.

The backflow execution time may be a time before the detected temperature of the thermal storage heat medium reaches another temperature such as a temperature of the thermal storage heat medium in the region where the forward path 4a of the heating circulation channel 4 is connected to the heating heat exchanger 5.

In a case where the backflow execution time is set at a time before the temperature of the thermal storage heat medium starts decreasing greatly, all the thermal storage heat medium remaining in the heating circulation channel 4 can return to the thermal storage tank 3, and heat transfer and superheat after the stop of the heating operation can be further reduced.

The set lowest temperature may be the temperature of the thermal storage heat medium in the region where the backward path 4b of the heating circulation channel 4 is connected to the lower portion of the thermal storage tank 3, in heating hot-water-supply water.

The set lowest temperature may be another temperature such as the temperature of the thermal storage heat medium in the region where the forward path 4a of the heating circulation channel 4 is connected to the heating heat exchanger 5, in heating hot-water-supply water.

In a case where the set lowest temperature is the temperature of the thermal storage heat medium in the region where the backward path 4b of the heating circulation channel 4 is connected to the lower portion of the thermal storage tank 3, in heating hot-water-supply water, it is determined whether all the high-temperature thermal storage heat medium remaining in the heating circulation channel 4 returns to a location that is closer to the thermal storage tank 3 than the temperature sensor 18 is. The location of the temperature sensor 18 corresponds to a predetermined location of the present invention.

The temperature sensor 18 may be provided to the region where the forward path 4a of the heating circulation channel 4 is connected to the upper portion of the thermal storage tank 3 or may be provided to the upper portion of the thermal storage tank 3.

With this configuration, it is determined whether all the thermal storage heat medium at a temperature greater than or equal to the set lowest temperature remaining in the heating circulation channel 4 returns to the thermal storage tank 3.

In a case where it is unnecessary to reduce heat transfer between the temperature sensor 18 and the upper portion of the thermal storage tank 3 in the heating circulation channel 4 and superheat in the heating heat exchanger 5, the temperature sensor 18 may be provided to the backward path 4b of the heating circulation channel 4.

In a case where it is necessary to reduce heat transfer in the entire heating circulation channel 4 and superheat in the heating heat exchanger 5, the set lowest temperature is set at the temperature of the thermal storage heat medium in the region where the backward path 4b of the heating circulation channel 4 is connected to the lower portion of the thermal storage tank 3, in heating hot-water-supply water, and the temperature sensor 18 is disposed in the region where the forward path 4a of the heating circulation channel 4 is connected to the upper region of the thermal storage tank 3.

Figure 2:
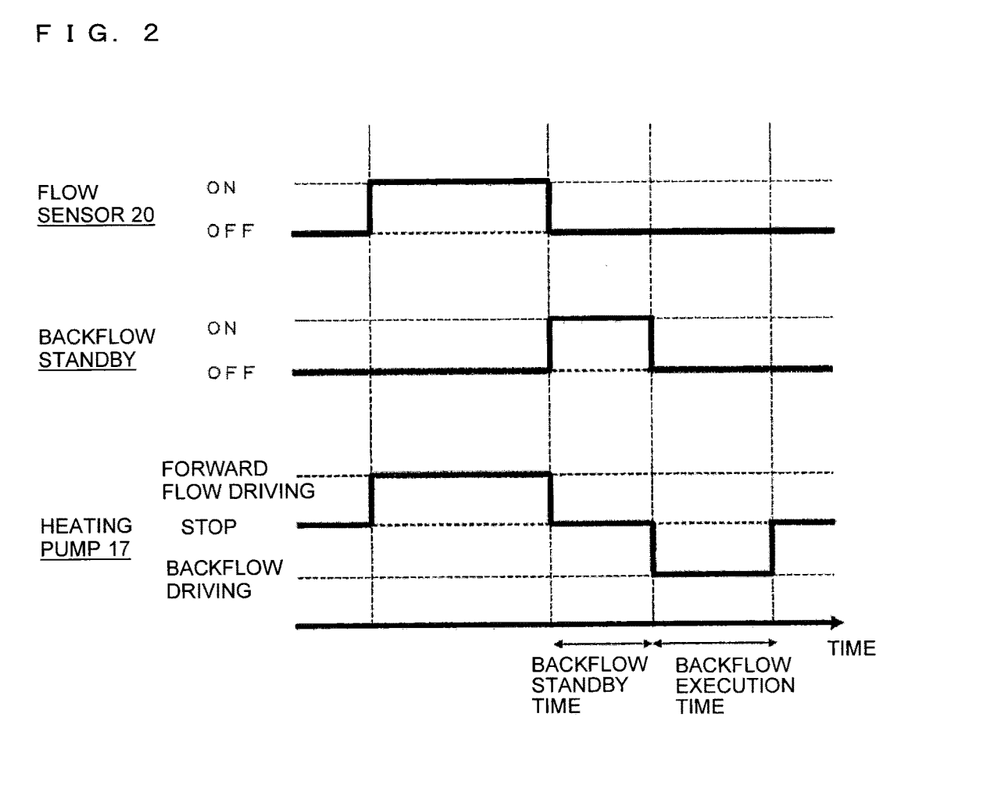
FIG. 2 is a timing chart of the thermal storage and exchange heating apparatus of Embodiment 1 of the present invention.

Referring now to FIG. 2, a circulation direction switching operation in the case of starting next heating operation after the stop of the heating operation from a lapse of the backflow standby time and the backflow execution time.

FIG. 2 is a timing chart of the thermal storage and exchange heating apparatus of Embodiment 1.

When the flow sensor 20 detects a flow of hot-water-supply water, that is, detects a hot water supply state, the controller 30 drives the heating pump 17 in a normal rotational direction so that the thermal storage heat medium circulates in the forward direction.

When the flow sensor 20 does not detect the flow of hot-water-supply water, that is, the hot water supply state, any more, the controller 30 promptly stops driving the heating pump 17 so as to stop the forward circulation of the thermal storage heat medium.

After having stopped the forward circulation of the thermal storage heat medium, the controller 30 suspends driving of the heating pump 17 in a backflow standby time (e.g., 30 seconds).

After a lapse of the backflow standby time from stopping the forward circulation of the thermal storage heat medium, the controller 30 drives the heating pump 17 in the reverse rotational direction so that the thermal storage heat medium circulates in the backward direction.

The controller 30 resets a record of the time that has elapsed from the stop of forward circulation of the thermal storage heat medium.

After having started the backward circulation of the thermal storage heat medium, the controller 30 continues the backward circulation in the backflow execution time (e.g., 10 seconds).

After a lapse of backflow execution time from the start of circulation of the thermal storage heat medium in the backward direction, the controller 30 stops driving the heating pump 17 so as to stop the backward circulation of the thermal storage heat medium.

The controller 30 resets a record of the time that has elapsed from the start of backward circulation of the thermal storage heat medium.

The controller 30 repeats the above operation.

Figure 3:
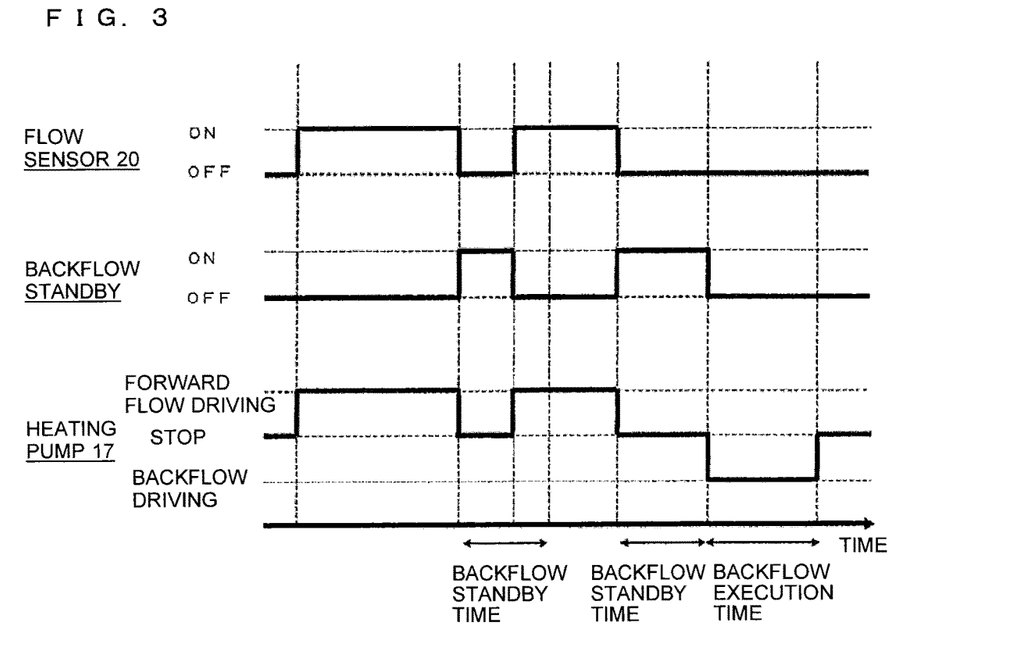
FIG. 3 is a timing chart of the thermal storage and exchange heating apparatus of Embodiment 1 of the present invention.

Referring now to FIG. 3, the circulation direction switching operation in a case where next heating operation subsequent to the stop of the heating operation starts in a backflow standby time will be described.

FIG. 3 is a timing chart of the thermal storage and exchange heating apparatus of Embodiment 1.

When the flow sensor 20 detects a flow of hot-water-supply water, that is, a hot water supply state, the controller 30 drives the heating pump 17 in the normal rotational direction so that the thermal storage heat medium circulates in the forward direction.

When the flow sensor 20 does not detect the flow of hot-water-supply water, that is, the hot water supply state, any more, the controller 30 promptly stops driving the heating pump 17 so as to stop the forward circulation of the thermal storage heat medium.

After having stopped the forward circulation of the thermal storage heat medium, the controller 30 sustains driving of the heating pump 17.

When the flow sensor 20 detects a flow of hot-water-supply water, that is, a hot water supply state, before the backflow standby time elapses after the stop of forward circulation of the thermal storage heat medium, the controller 30 drives the heating pump 17 in the normal rotational direction so that the thermal storage heat medium circulates in the forward direction.

The controller 30 resets a record of the time that has elapsed from the stop of forward circulation of the thermal storage heat medium.

Subsequent operation is similar to that shown in FIG. 2.

Figure 4:
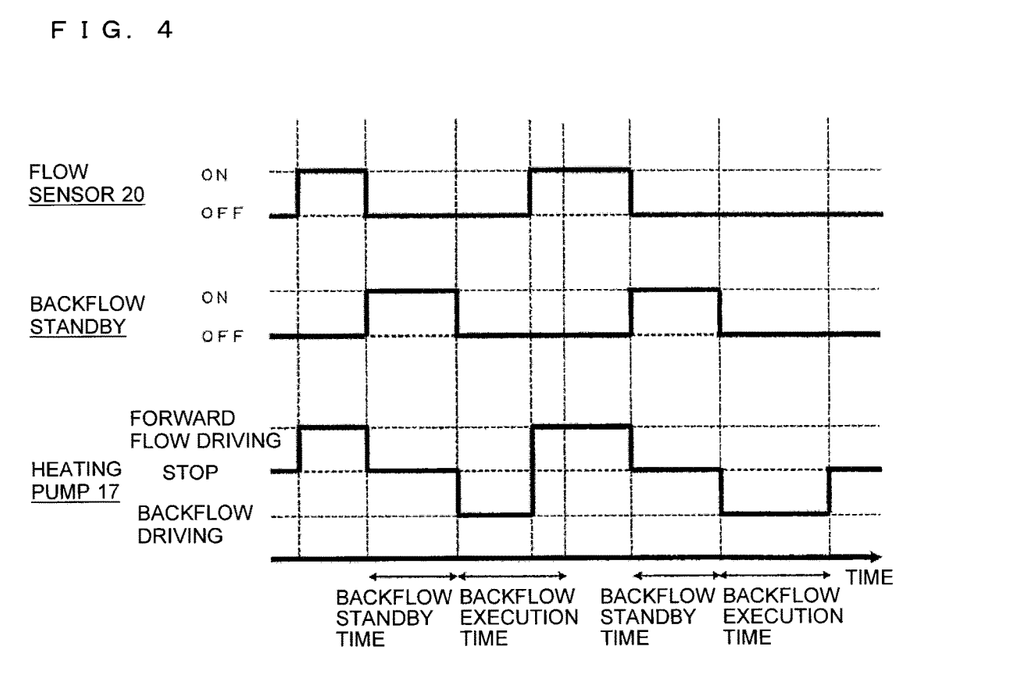
FIG. 4 is a timing chart of the thermal storage and exchange heating apparatus of Embodiment 1 of the present invention.

Referring now to FIG. 4, the circulation direction switching operation in a case where next heating operation starts in the backflow execution time.

FIG. 4 is a timing chart of the thermal storage and exchange heating apparatus of Embodiment 1.

When the flow sensor 20 detects a flow of hot-water-supply water, that is, a hot water supply state, the controller 30 drives the heating pump 17 in the normal rotational direction so that the thermal storage heat medium circulates in the forward direction.

When the flow sensor 20 does not detect the flow of hot-water-supply water, that is, the hot water supply state, any more, the controller 30 promptly stops driving the heating pump 17 so as to stop the forward circulation of the thermal storage heat medium.

After having stopped the forward circulation of the thermal storage heat medium, the controller 30 sustains driving of the heating pump 17 in the backflow standby time (e.g., 30 seconds).

After a lapse of the backflow standby time from the stop of forward circulation of the thermal storage heat medium, the controller 30 drives the heating pump 17 in the reverse rotational direction so that the thermal storage heat medium circulates in the backward direction.

The controller 30 resets a record of the time that has elapsed from the stop of forward circulation of the thermal storage heat medium.

When the flow sensor 20 detects a flow of hot-water-supply water, that is, a hot water supply state, before the backflow execution time elapses after the start of backward circulation of the thermal storage heat medium, the controller 30 drives the heating pump 17 in the normal rotational direction so that the thermal storage heat medium circulates in the forward direction.

The controller 30 resets a record of the time that has elapsed from the start of backward circulation of the thermal storage heat medium.

Subsequent operation is similar to that shown in FIG. 2.

As described above, the thermal storage and exchange heating apparatus of Embodiment 1 can return the heat thermal storage heat medium remaining in the heating circulation channel 4 and the heating heat exchanger 5 and transferring heat after the stop of the heating operation, to the thermal storage tank 3.

Thus, the thermal storage and exchange heating apparatus of Embodiment 1 can reduce heat transfer and effectively use residual heat, thereby enhancing energy saving performance.

Since the thermal storage and exchange heating apparatus of Embodiment 1 can effectively utilize heat stored in the thermal storage tank 3, the capacity of the thermal storage tank 3 can be reduced.

In addition, in the thermal storage and exchange heating apparatus of Embodiment 1, superheat from the thermal storage heat medium to hot-water-supply water in the heating heat exchanger 5 can be reduced so that generation of scales can be reduced, and performance degradation and lifetime decrease of the heating heat exchanger 5 can be reduced.

In the thermal storage and exchange heating apparatus of Embodiment 1, the backward circulation starts after the backflow standby time has elapsed from a stop of forward circulation of the thermal storage heat medium.

Thus, in the thermal storage and exchange heating apparatus of Embodiment 1, in a case where the hot water supply state occurs again within a period in which heat transfer from the thermal storage heat medium is small, that is, within the backflow standby time, no backward circulation is performed and the thermal storage heat medium in the heating circulation channel 4 and the heating heat exchanger 5 can be kept at a high temperature. Thus, the temperature of hot-water-supply water can be increased to a desired temperature promptly when heating is restarted. As a result, degradation in comfort and convenience can be reduced.

The thermal storage and exchange heating apparatus of Embodiment 1 performs the backward circulation only in the backflow execution time.

Thus, the thermal storage and exchange heating apparatus of Embodiment 1 ensures that only the high-temperature thermal storage heat medium returns to the thermal storage tank 3.

In the thermal storage and exchange heating apparatus of Embodiment 1, when the temperature of the thermal storage heat medium detected by the temperature sensor 18 decreases below the set lowest temperature, the backward circulation stops even when the backflow execution time does not elapse from the start of backward circulation.

Accordingly, in the thermal storage and exchange heating apparatus of Embodiment 1, even in a case where heat transfer exceeds an expected degree, it is possible to reduce returning of the low-temperature thermal storage heat medium to the thermal storage tank 3, thereby ensuring that only the high-temperature thermal storage heat medium returns to the thermal storage tank 3.

In addition, the thermal storage and exchange heating apparatus of Embodiment 1 can switch the flow between the forward circulation and backward circulation only by changing the direction of rotation of the heating pump 17.

Thus, the thermal storage and exchange heating apparatus of Embodiment 1 can obtain a configuration for backflow of the thermal storage heat medium easily at low cost.

(Variations)

The thermal storage and exchange heating apparatus 100 uses the heat pump 1 as a heat source. Alternatively, the thermal storage and exchange heating apparatus 100 may use other heat sources such as a boiler and a solar water heater as long as the thermal storage heat medium can be heated to a desired temperature.

In the thermal storage and exchange heating apparatus 100, the thermal storage pump 13 is provided to a portion of the backward path 2b of the thermal storage circulation channel 2. Alternatively, the thermal storage pump 13 may be provided to a portion of the forward path 2a of the thermal storage circulation channel 2.

In this case, the thermal storage pump 13 needs heat resistance, and heat transfer increases.

In the thermal storage and exchange heating apparatus 100, the heating pump 17 is provided to a portion of the backward path 4b of the heating circulation channel 4. Alternatively, the heating pump 17 may be provided to a portion of the forward path 4a of the heating circulation channel 4.

In this case, the heating pump 17 needs heat resistance, and heat transfer increases.

The thermal storage and exchange heating apparatus 100 includes the bypass channel 14. Alternatively, the thermal storage and exchange heating apparatus 100 may include an air conditioning channel branching from a portion of the forward path 2a of the thermal storage circulation channel 2 and merged with a portion of the backward path 2b of the thermal storage circulation channel 2 and an air conditioning load provided to a portion of the air conditioning channel.

The air conditioning load is, for example, an air conditioning radiator, fan coil unit, and a floor heating unit.

The thermal storage heat medium circulates in a channel between the air conditioning load and the heat pump heat exchanger 9.

When the thermal storage heat medium is not heated to a temperature at which the thermal storage function is obtained, for example, immediately after the start of the thermal storage operation, the controller 30 supplies the thermal storage heat medium to the air conditioning channel.

In such a configuration, the air conditioning channel serves as the bypass channel 14, and thus, the thermal storage and exchange heating apparatus 100 does not need to include the bypass channel 14.

In the thermal storage and exchange heating apparatus 100, hot-water-supply water is supplied to the heating heat exchanger 5 by using the pressure difference between the water supply source 19 and hot-water-supply water in the hot water supply target 21. If this pressure difference is insufficient, a pump may be provided to a the hot water supply channel 6 upstream of the heating heat exchanger 5 or the hot water supply channel 6 downstream of the heating heat exchanger 5.

In the thermal storage and exchange heating apparatus 100, the flow sensor 20 detects a flow of hot-water-supply water. Alternatively, the thermal storage and exchange heating apparatus 100 may include a flow rate sensor for detecting the flow rate of hot-water-supply water so that a flow of hot-water-supply water can be detected based on the flow rate.

The thermal storage and exchange heating apparatus 100 determines both whether the backflow execution time has elapsed after the start of backward circulation and whether the temperature of the thermal storage heat medium detected by the temperature sensor 18 is below the set lowest temperature. Alternatively, the thermal storage and exchange heating apparatus 100 may perform one of these two determinations.

In the case of determining only whether the backflow execution time has elapsed after the start of backward circulation, the thermal storage and exchange heating apparatus 100 does not need to include the temperature sensor 18.

In the case of determining whether the temperature of the thermal storage heat medium detected by the temperature sensor 18 is below the set lowest temperature, only the high-temperature thermal storage heat medium can return to the thermal storage tank 3 without fail depending on the state of heat transfer.

In stopping the backward circulation, the thermal storage and exchange heating apparatus 100 determines whether the backflow execution time has elapsed from the start of backward circulation. Alternatively, the thermal storage and exchange heating apparatus 100 may determine the total flow rate of a backflow of the thermal storage heat medium. The total flow rate serving as a criterion of determination corresponds to a "predetermined total flow rate" of the present invention.

The total flow rate is obtained by detecting the flow rate of a backflow of the thermal storage heat medium with a flow rate sensor and integrating detected flow rates.

The flow rate sensor may not be provided. In this case, the total flow rate is obtained by integration by using a flow rate estimated from the rotation speed of the heating pump 17.

In such a case, the cost of the thermal storage and exchange heating apparatus 100 can be reduced.

In the thermal storage and exchange heating apparatus 100, the backward circulation starts after the backflow standby time has elapsed from the stop of forward circulation of the thermal storage heat medium. Alternatively, the backward circulation may start immediately after a stop of a heating operation.

When the hot water supply state is established again after a short interval, comfort and convenience decrease, but the other advantages are similarly obtained.

In the thermal storage and exchange heating apparatus 100, the upper portion of the thermal storage tank 3 is referred to as the "high-temperature side" of the present invention, and the lower portion of the thermal storage tank 3 is referred to as the "low-temperature side" of the present invention. However, the "high-temperature side" and the "low-temperature side" are not limited to the upper and lower portions of the thermal storage tank 3.

It is sufficient that in the thermal storage operation, the side at which the thermal storage heat medium flows into the thermal storage tank 3 is the "high-temperature side" and the side at which the thermal storage heat medium flows out of the thermal storage tank 3 is the "low-temperature side."

Embodiment 2

A thermal storage and exchange heating apparatus according to Embodiment 2 will be described.

Parts of, for example, the configuration, operation, and advantages already described in Embodiment 1 will not be repeated.

First, the configuration of the thermal storage and exchange heating apparatus of Embodiment 2 will be described with reference to FIG. 5.

Figure 5:
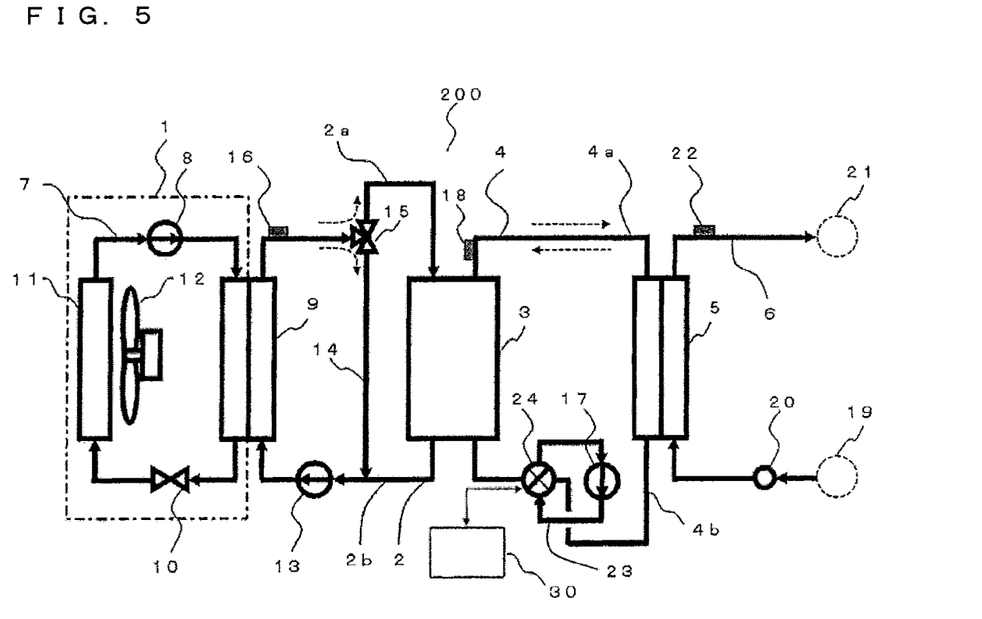
FIG. 5 illustrates a configuration of a thermal storage and exchange heating apparatus according to Embodiment 2 of the present invention.

FIG. 5 illustrates a configuration of the thermal storage and exchange heating apparatus of Embodiment 2.

A thermal storage and exchange heating apparatus 200 is different from the thermal storage and exchange heating apparatus 100 of Embodiment 1 only in a heating circulation channel 4. Thus, only the heating circulation channel 4 will be described.

An upper portion of a thermal storage tank 3 is connected to the heating circulation channel 4.

In the heating circulation channel 4, a thermal storage heat medium circulates.

The heating circulation channel 4 is provided with a heating pump 17 that allows the thermal storage heat medium to circulate, a switching pipe 23, a switching valve 24, and a temperature sensor 18 that detects the temperature of the thermal storage heat medium between an upper portion of the thermal storage tank 3 and a heating heat exchanger 5.

The heating circulation channel 4 is connected to a lower portion of the thermal storage tank 3.

The heating pump 17 is not a bidirectional rotary pump that can rotate in opposite directions, and a one-way rotation pump that cannot rotate in opposite directions.

The switching valve 24 is a four-way valve.

The switching valve 24 is not limited to a four-way valve as long as the flow direction of the thermal storage heat medium from the switching pipe 23 to the heating circulation channel 4 is switched.

The operation of the thermal storage and exchange heating apparatus of Embodiment 2 will now be described.

The thermal storage and exchange heating apparatus 200 is different from the thermal storage and exchange heating apparatus 100 of Embodiment 1 only in the circulation direction switching operation. Thus, only the circulation direction switching operation will be described.

(Circulation Direction Switching Operation)

The circulation direction switching operation of the thermal storage and exchange heating apparatus of Embodiment 2 will be described.

The thermal storage and exchange heating apparatus 200 employs a one-way rotation pump that cannot rotate in opposite directions as a heating pump 17, and control the opening direction of the switching valve 24. Thus, the thermal storage heat medium in the heating circulation channel 4 is allowed to circulate in a forward direction and a backward direction.

The control of the opening direction of the switching valve 24 changes the direction of flow of the thermal storage heat medium from the switching pipe 23 to the heating circulation channel 4, and the circulation direction of the thermal storage heat medium in the heating circulation channel 4 is switched between the forward direction and the backward direction.

Other operations such as operation shown in a timing chart are similar to those of thermal storage and exchange heating apparatus 100 of Embodiment 1.

As described above, the thermal storage and exchange heating apparatus 200 can change the circulation direction of the thermal storage heat medium in the heating circulation channel 4 while maintaining the direction of rotation of the heating pump 17. Thus, the circulation direction switching operation can be performed without a decrease in rotation efficiency of the heating pump 17. In a case where the heating pump 17 is a bidirectional rotary pump as in the thermal storage and exchange heating apparatus 100 of Embodiment 1, the rotation efficiency in a reverse direction is generally low, and the flow rate in the reverse direction is lower than that in the normal direction under the same rotation speed.

Thus, the thermal storage and exchange heating apparatus of Embodiment 2 can reduce a backflow execution time, and enhance energy saving performance.

Embodiment 3

A thermal storage and exchange heating apparatus according to Embodiment 3 will be described.

Parts of, for example, the configuration, operation, and advantages already described in Embodiment 1 will not be repeated.

In the following description is mainly directed to the case of using the thermal storage and exchange heating apparatus of Embodiment 3 alone. However, the thermal storage and exchange heating apparatus of Embodiment 3 may be used with the thermal storage and exchange heating apparatus of Embodiment 1 and/or the thermal storage and exchange heating apparatus of Embodiment 2.

First, the configuration of the thermal storage and exchange heating apparatus of Embodiment 3 will be described with reference to FIG. 6.

Figure 6:
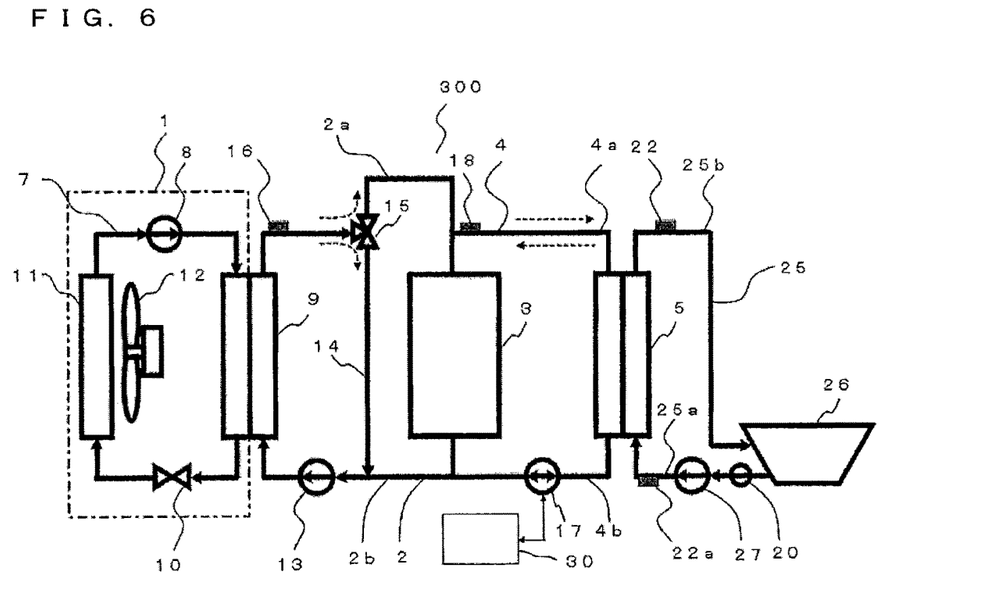
FIG. 6 illustrates a configuration of a thermal storage and exchange heating apparatus according to Embodiment 3 of present invention.

FIG. 6 illustrates a configuration of the thermal storage and exchange heating apparatus of Embodiment 3.

A thermal storage and exchange heating apparatus 300 includes a heat pump 1, a thermal storage circulation channel 2, a thermal storage tank 3, a heating circulation channel 4, a heating heat exchanger 5, a reheating circulation channel 25, and a bath 26.

The heating heat exchanger 5 is connected to the heating circulation channel 4 and the reheating circulation channel 25.

Bath water is supplied to the reheating circulation channel 25. The bath water corresponds to a "heating object" of the present invention.

The reheating circulation channel 25 is provided with a flow sensor 20 that detects the presence of a flow of bath water between the bath 26 and the heating heat exchanger 5, a circulation pump 27 that allows bath water to circulate, a temperature sensor 22, and a temperature sensor 22a.

The flow sensor 20 is a sensor that turns on or off depending on the presence of a flow of bath water.

The temperature sensor 22 is provided to a portion of a backward path 25b of the reheating circulation channel 25, and detects the temperature of bath water heated by the heating heat exchanger 5.

The temperature sensor 22a is provided to a portion of a forward path 25a of the reheating circulation channel 25 or in the bath 26, and detects the temperature of bath water before being heated by the heating heat exchanger 5.

The other part of the configuration is similar to that of the thermal storage and exchange heating apparatus 100 of Embodiment 1.

The operation of the thermal storage and exchange heating apparatus of Embodiment 3 will now be described.

The thermal storage and exchange heating apparatus 300 is different from the thermal storage and exchange heating apparatus 100 of Embodiment 1 only in the heating operation and the circulation direction switching operation. Thus, only the heating operation and the circulation direction switching operation will be described.

(Heating Operation)

Heating operation in the thermal storage and exchange heating apparatus of Embodiment 3 will be described.

In a reheating state, a thermal storage heat medium is supplied from an upper portion of a thermal storage tank 3 to the heating heat exchanger 5 by way of a forward path 4a of the heating circulation channel 4.

Accordingly, the thermal storage heat medium is supplied from the heating heat exchanger 5 to a lower portion of the thermal storage tank 3 by way of a backward path 4b of the heating circulation channel 4.

In the reheating state, heat exchange is performed between the thermal storage heat medium in the heating circulation channel 4 and bath water in the reheating circulation channel 25 in the heating heat exchanger 5.

At this time, bath water in the same amount as bath water supplied from the heating heat exchanger 5 to the bath 26 is supplied from the bath 26 to the heating heat exchanger 5.

A power source for causing bath water to circulate in the reheating circulation channel 25 is a circulation pump 27 provided to the forward path 25a of the reheating circulation channel 25 disposed between the bath 26 and the heating heat exchanger 5.

The presence of the reheating state is determined by detecting a flow of bath water by the flow sensor 20 and detecting whether the temperature of bath water is lower than the set temperature (e.g., 40 degrees C.) of bath water in the bath 26 with the temperature sensor 22a.

This determination is performed with the circulation pump 27 being driven in a predetermined time at a predetermined time interval (e.g., 10 minutes).

If the flow is detected and the temperature of bath water is low, the heating operation for reheating is performed. On the other hand, if no flow is detected or the temperature of bath water is not low, the heating operation for reheating is not performed.

The heating operation herein is the same as operation of the heating pump 17.

That is, in performing the heating operation, the heating pump 17 is driven. In performing no heating operation, the heating pump 17 is not driven.

If no flow is detected, it is determined that the amount of bath water in the bath 26 is insufficient.

Specifically, in the case of using both the thermal storage and exchange heating apparatus 300 and the thermal storage and exchange heating apparatus 100 of Embodiment 1, the controller 30 can automatically switch reheating operation to hot water supply operation depending on the detection result on the presence of a flow of bath water by the flow sensor 20, and can control the water level as well as the temperature of bath water in the bath 26.

Next, temperature control in the heating operation will be described.

In the thermal storage and exchange heating apparatus 100 of Embodiment 1, the flow rate of hot-water-supply water in the hot water supply channel 6 is determined depending on the opening degree of a faucet of the hot water supply target 21. Thus, the flow rate of hot-water-supply water supplied to the heating heat exchanger 5 cannot be controlled.

In addition, the temperature of hot-water-supply water supplied to the heating heat exchanger 5 does not greatly change.

Thus, the thermal storage and exchange heating apparatus 100 of Embodiment 1 controls the temperature of hot-water-supply water to a desired temperature by changing the flow rate of the thermal storage heat medium in the heating circulation channel 4.

On the other hand, the thermal storage and exchange heating apparatus 300 can control the flow rate of bath water in the reheating circulation channel 25 by changing the rotation speed of the circulation pump 27.

In addition, since the temperature of bath water in the bath 26 gradually increases as reheating progresses, the temperature of bath water supplied to the heating heat exchanger 5 greatly changes.

Thus, the thermal storage and exchange heating apparatus 300 performs control different from that of the thermal storage and exchange heating apparatus 100 of Embodiment 1.

The rotation speed of the heating pump 17 used for determining the flow rate of the thermal storage heat medium in the heating circulation channel 4 is fixed depending on an expected necessary quantity of heat.

The controller 30 controls the temperature of bath water detected by the temperature sensor 22 to a desired temperature (e.g., 45 degrees C. if the set temperature of bath water in the bath 26 is 40 degrees C.) by changing the rotation speed of the circulation pump 27 used for determining the flow rate of bath water in the reheating circulation channel 25.

The controller 30 stops the heating operation when the temperature of bath water detected by the temperature sensor 22a reaches a set temperature (e.g., 40 degrees C.) of bath water in the bath 26.

In such a control, as the temperature of bath water in the bath 26 gradually increases, the temperature of bath water detected by the temperature sensor 22a increases while the temperature of bath water detected by the temperature sensor 22 being kept uniform. Thus, the flow rate of bath water circulating in the reheating circulation channel 25 gradually increases.

In addition, the quantity of heat necessary for determining the rotation speed of the heating pump 17 can be calculated from the maximum flow rate of bath water that is caused to flow by the circulation pump 27 and the difference (e.g., 5 degrees C. in the above example) between the temperature (i.e., the temperature of bath water detected by the temperature sensor 22a) of bath water before passing through the heating heat exchanger 5 and the temperature (i.e., the temperature of bath water detected by the temperature sensor 22) of bath water after passing through the heating heat exchanger 5 in stopping the heating operation.
(Circulation Direction Switching Operation)

The circulation direction switching operation in the thermal storage and exchange heating apparatus of Embodiment 3 will be described.

The thermal storage and exchange heating apparatus 300 employs a bidirectional rotary pump that can rotate in opposite directions as the heating pump 17. Thus, the thermal storage heat medium in the heating circulation channel 4 can circulate in the forward direction and the backward direction.

To heat bath water, the heating pump 17 causes the thermal storage heat medium to circulate in the forward direction.

To stop heating of bath water, the heating pump 17 causes the thermal storage heat medium to circulate in the backward direction, and returns the high-temperature thermal storage medium remaining in the heating circulation channel 4 and the heating heat exchanger 5 to the thermal storage tank 3.

The controller 30 performs the backward circulation in a backflow execution time.

After a start of the backward circulation, if the temperature of the thermal storage heat medium detected by the temperature sensor 18 decreases below a predetermined set lowest temperature (e.g., 60 degrees C.), the controller 30 stops the backward circulation even before the backflow execution time does not elapse from the start of the backward circulation.

Unlike hot water supply, the thermal storage and exchange heating apparatus 300 does not need to increase the temperature of bath water to a desired temperature as soon as possible in starting next heating operation immediately after a stop of a heating operation. Thus, the backflow standby time does not need to be provided.

Figure 7:
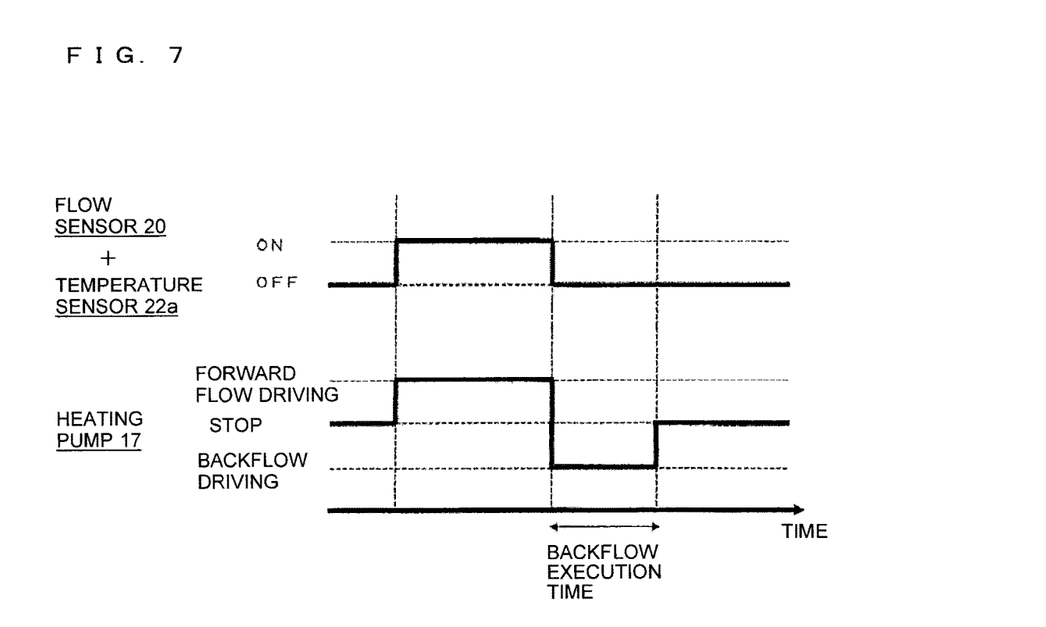
FIG. 7 is a timing chart of the thermal storage and exchange heating apparatus according to Embodiment 3 of the present invention.

Referring now to FIG. 7, the circulation direction switching operation in a case where next heating operation subsequent to the stop of the heating operation starts after a lapse of the backflow execution time will be described.

FIG. 7 is a timing chart of the thermal storage and exchange heating apparatus of Embodiment 3.

When the flow sensor 20 detects a flow of bath water and the temperature sensor 22a detects that the temperature of bath water is lower than a predetermined temperature, that is, detects a reheating state, the controller 30 drives the heating pump 17 in a normal rotational direction so that the thermal storage heat medium circulates in the forward direction.

If the flow sensor 20 does not detect the flow of bath water or the temperature sensor 22a does not detect that the temperature of bath water is lower than the predetermined temperature, that is, does not detect the reheating state, any more, the controller 30 promptly stops driving the heating pump 17, and stops the forward circulation of the thermal storage heat medium.

The controller 30 drives the heating pump 17 in the reverse rotational direction so that the thermal storage heat medium circulates in the backward direction.

After having started the backward circulation of the thermal storage heat medium, the controller 30 continues the backward circulation in the backflow execution time (e.g., 10 seconds).

When the backflow execution time has elapsed from the start of the backward circulation of the thermal storage heat medium, the controller 30 stops driving the heating pump 17 so as to stop the backward circulation of the thermal storage heat medium.

The controller 30 resets a record of the time that has elapsed from the start of the backward circulation of the thermal storage heat medium.

Figure 8:
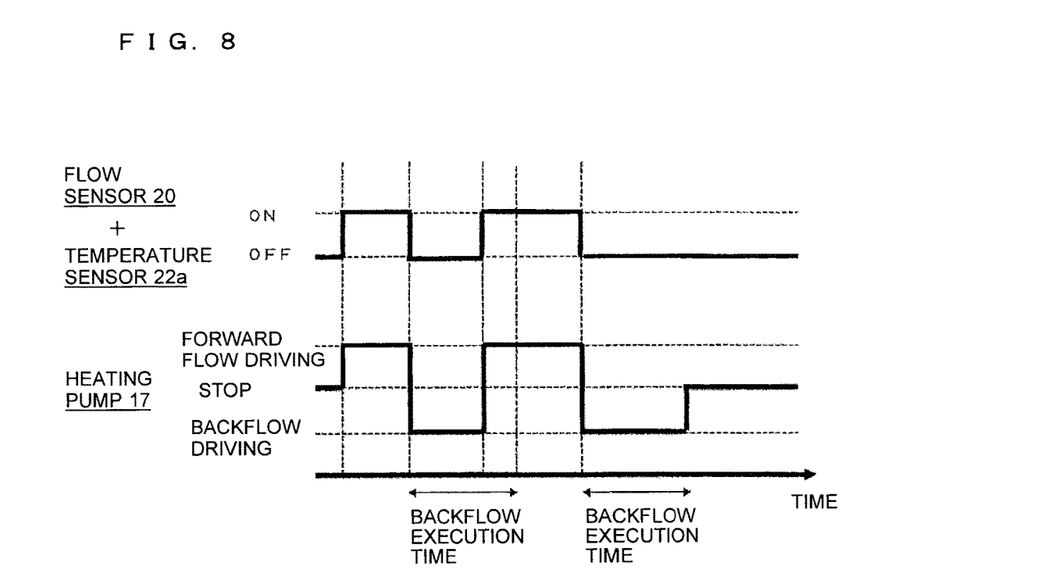
FIG. 8 is a timing chart of the thermal storage and exchange heating apparatus of Embodiment 3.

Referring now to FIG. 8, switching operation of the circulation direction in a case where next heating operation starts in the backflow execution time will be described.

FIG. 8 is a timing chart of the thermal storage and exchange heating apparatus of Embodiment 3.

When the flow sensor 20 detects a flow of bath water and the temperature sensor 22a detects that the temperature of bath water is lower than a predetermined temperature, that is, a reheating state, the controller 30 drives the heating pump 17 in the normal rotational direction so that the thermal storage heat medium circulates in the forward direction.

When the flow sensor 20 does not detect the flow of bath water or the temperature sensor 22a does not detect that the temperature of bath water is lower than the predetermined temperature, that is, does not detect the reheating state, any more, the controller 30 promptly stops driving the heating pump 17 so as to stop the forward circulation of the thermal storage heat medium.

The controller 30 drives the heating pump 17 in the reverse rotational direction so that the thermal storage heat medium circulates in the backward direction.

Before the backflow execution time elapses after a start of the backward circulation of the thermal storage heat medium, when the flow sensor 20 detects a flow of bath water and the temperature sensor 22a detects that the temperature of bath water is lower than a predetermined temperature, that is, detects a reheating state, the controller 30 drives the heating pump 17 in the normal rotational direction so that the thermal storage heat medium circulates in the forward direction.

The controller 30 resets a record of the time that has elapsed from the start of the backward circulation of the thermal storage heat medium.

Subsequent operation is similar to that shown in FIG. 7.

(Variations)

The heating circulation channel 4 of the thermal storage and exchange heating apparatus 300 may be replaced by the heating circulation channel 4 of the thermal storage and exchange heating apparatus 200 of Embodiment 2.

In a case where the thermal storage and exchange heating apparatus 100 of Embodiment 1, the thermal storage and exchange heating apparatus 200 of Embodiment 2, and the thermal storage and exchange heating apparatus 300 are used together, the heating pump 17 may be shared.

In this case, the switching valve for switching the opening direction is provided in order to switch supply of the thermal storage heat medium among supply to the heating heat exchanger 5 for hot water supply, supply to the heating heat exchanger 5 for reheating, and supply to both the heating heat exchanger 5 for hot water supply and the heating heat exchanger 5 for reheating.

In this switching, the backward circulation in the thermal storage and exchange heating apparatus 100 of Embodiment 1 and the thermal storage and exchange heating apparatus 200 of Embodiment 2 and the backward circulation in the thermal storage and exchange heating apparatus 300 are preferably individually controlled.

In such a configuration, only one heating pump 17 is sufficient so that the cost and space can be reduced advantageously.

The foregoing description has been directed to the thermal storage and exchange heating apparatus of Embodiments 1 to 3. However, the present invention is not limited to Embodiments 1 to 3.

For example, Embodiments 1 to 3 and variations thereof may be combined.

In each of the thermal storage and exchange heating apparatus of Embodiment 1 and the thermal storage and exchange heating apparatus of Embodiment 2, the thermal storage heat medium is stored in the thermal storage tank 3 and heat exchange is performed between the thermal storage heat medium and hot-water-supply water in the heating heat exchanger 5 so that hot-water-supply water is heated. Alternatively, the heat exchanger may have such a configuration as that of a typical thermal storage and exchange heating apparatus in which hot-water-supply water also serves as a thermal storage heat medium, hot-water-supply water is supplied from a thermal storage tank 3 to a hot water supply target 21, and hot-water-supply water is supplied from a water supply source 19 to the thermal storage tank 3.

Such a thermal storage and exchange heating apparatus may be used with the thermal storage and exchange heating apparatus of Embodiment 1 and the thermal storage and exchange heating apparatus of Embodiment 2, or may be used with the thermal storage and exchange heating apparatus of Embodiment 3.

In each case, similar advantages can be obtained.

REFERENCE SIGNS LIST 1 heat pump, 2 thermal storage circulation channel, 2a forward path, 2b backward path, 3 thermal storage tank, 4 heating circulation channel, 4a forward path, 4b backward path, 5 heating heat exchanger, 6 hot water supply channel, 7 heat pump circulation channel, 8 compressor, 9 heat pump heat exchanger, 10 expansion valve, 11 outdoor air heat exchanger, 12 fan, 13 thermal storage pump, 14 bypass channel, 15 switching valve, 16 temperature sensor, 17 heating pump, 18 temperature sensor, 19 water supply source, 20 flow sensor, 21 hot water supply target, 22 temperature sensor, 22a temperature sensor, 23 switching pipe, 24 switching valve, 25 reheating circulation channel, 25a forward path, 25b backward path, 26 bath, 27 circulation pump, 30 controller, 100 thermal storage and exchange heating apparatus, 200 thermal storage and exchange heating apparatus, 300 thermal storage and exchange heating apparatus

The invention claimed is:

1. A heating apparatus comprising:
    a thermal storage tank that stores a heat medium heated by a heat source;
    a thermal storage circulation channel connected between the heat source and the thermal storage tank, and through which the heat medium circulates;

a heating circulation channel connected to a high-temperature side and a low-temperature side of the thermal storage tank, and through which the heat medium circulates separately from a circulation of the heat medium in the thermal storage circulation channel, the high-temperature side of the thermal storage tank being a side at which the heat medium flows into the thermal storage tank in a thermal storage operation of the thermal storage tank, the low-temperature side of the thermal storage tank being a side at which the heat medium flows out of the thermal storage tank in the thermal storage operation of the thermal storage tank;
a heat exchanger provided to the heating circulation channel and configured to exchange heat between the heat medium and a heating object and to heat the heating object;
a circulation direction switching device configured to switch circulation of the heat medium in the heating circulation channel between a forward direction from the high-temperature side of the thermal storage tank to the low-temperature side of the thermal storage tank and a backward direction from the low-temperature side of the thermal storage tank to the high-temperature side of the thermal storage tank; and
a controller configured to cause the heat medium to circulate in the forward direction set by switching of the circulation direction switching device in a heating operation of the heating object and cause the heat medium to temporarily circulate in the backward direction set by switching of the circulation direction switching device after a stop of the heating operation of the heating object.

2. The heating apparatus of claim 1, wherein
the controller causes the heat medium to circulate in the backward direction set by switching of the circulation direction switching device after a lapse of a first predetermined time immediately from the stop of the heating operation of the heating object.

3. The heating apparatus of claim 1, wherein
the controller causes the heat medium to circulate in the backward direction set by switching of the circulation direction switching device immediately after the stop of the heating operation of the heating object.

4. The heating apparatus of claim 1, wherein
the controller causes the heat medium to circulate in the backward direction set by switching of the circulation direction switching device for a second predetermined time or for a predetermined total flow rate such that only the heat medium at a temperature higher than a first predetermined temperature in the heating circulation channel is returned to the thermal storage tank.

5. The heating apparatus of claim 4, wherein
the first predetermined temperature is a temperature of the heat medium in a region where the heating circulation channel is connected to the low-temperature side of the thermal storage tank in the heating operation of the heating object.

6. The heating apparatus of claim 1, wherein
the controller causes the heat medium to circulate in the backward direction set by switching of the circulation direction switching device until a temperature of the heat medium at a predetermined location of the heating circulation channel becomes lower than a second predetermined temperature.

7. The heating apparatus of claim 6, wherein
the second predetermined temperature is a temperature of the heat medium in a region where the heating circulation channel is connected to a low-temperature side of the thermal storage tank in the heating operation of the heating object.

8. The heating apparatus of claim 6, wherein
the predetermined location is in a region where the heating circulation channel is connected to the high-temperature side of the thermal storage tank.

9. The heating apparatus of claim 1, wherein
the circulation direction switching device is a pump provided to the heating circulation channel, and a direction of rotation of the pump differs between the forward direction and the backward direction.

10. The heating apparatus of claim 1, wherein
the circulation direction switching device is a valve provided to the heating circulation channel, and an opening direction of the valve differs between the forward direction and the backward direction.

11. A heating apparatus comprising:
a thermal storage tank that stores a heated heat medium;
a heating circulation channel connected to a high-temperature side and a low-temperature side of the thermal storage tank, and through which the heat medium circulates;
a heat exchanger provided to the heating circulation channel and configured to exchange heat between the heat medium and a heating object and to heat the heating object;
a circulation direction switching device configured to switch circulation of the heat medium in the heating circulation channel between a forward direction from the high-temperature side of the thermal storage tank to the low-temperature side of the thermal storage tank and a backward direction from the low-temperature side of the thermal storage tank to the high-temperature side of the thermal storage tank; and
a controller configured to cause the heat medium to circulate in the forward direction set by switching of the circulation direction switching device in a heating operation of the heating object and cause the heat medium to circulate in the backward direction set by switching of the circulation direction switching device after a stop of the heating operation of the heating object, wherein
the controller is further configured to cause the heat medium to circulate in the backward direction set by switching of the circulation direction switching device for a second predetermined time or for a predetermined total flow rate such that only the heat medium at a temperature higher than a first predetermined temperature in the heating circulation channel is returned to the thermal storage tank.

12. A heating apparatus comprising:
a thermal storage tank that stores a heated heat medium;
a heating circulation channel connected to a high-temperature side and a low-temperature side of the thermal storage tank, and through which the heat medium circulates;
a heat exchanger provided to the heating circulation channel and configured to exchange heat between the heat medium and a heating object and to heat the heating object;
a circulation direction switching device configured to switch circulation of the heat medium in the heating circulation channel between a forward direction from the high-temperature side of the thermal storage tank to the low-temperature side of the thermal storage tank and a backward direction from the low-temperature side of the thermal storage tank to the high-temperature side of the thermal storage tank; and a controller configured to cause the heat medium to circulate in the forward direction set by switching of the circulation direction switching device in a heating operation of the heating object and cause the heat medium to circulate in the backward direction set by switching of the circulation direction switching device after a stop of the heating operation of the heating object, wherein the controller is further configured to cause the heat medium to circulate in the backward direction set by switching of the circulation direction switching device until a temperature of the heat medium at a predetermined location of the heating circulation channel becomes lower than a second predetermined temperature.

* * * * *